United States Patent
Itoh (10) Patent No.: US 8,472,090 B2
(45) Date of Patent: Jun. 25, 2013

(54) IMAGE DISPLAY SYSTEM

(75) Inventor: Kenji Itoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 333 days.

(21) Appl. No.: 12/897,986

(22) Filed: Oct. 5, 2010

(65) Prior Publication Data

US 2011/0080623 A1    Apr. 7, 2011

(30) Foreign Application Priority Data

Oct. 6, 2009  (JP) ................................. 2009-232686

(51) Int. Cl.
*H04N 1/04* (2006.01)

(52) U.S. Cl.
USPC ...... 358/474; 358/1.15; 358/501; 348/333.12

(58) Field of Classification Search
USPC ............... 358/474, 486, 497, 488, 448, 501, 358/505, 494, 1.15, 1.14, 1.9, 540; 348/333.12, 348/240.2
See application file for complete search history.

(56) References Cited

U.S. PATENT DOCUMENTS

| | | | | |
|---|---|---|---|---|
| 4,751,584 A * | 6/1988 | Midorikawa | ................. | 358/401 |
| 5,905,530 A * | 5/1999 | Yokota et al. | ............. | 348/240.99 |
| 6,266,085 B1 * | 7/2001 | Kato et al. | ................. | 348/211.7 |
| 6,359,649 B1 * | 3/2002 | Suzuki | ....................... | 348/220.1 |
| 6,657,658 B2 * | 12/2003 | Takemura | ................ | 348/207.99 |
| 6,724,990 B2 * | 4/2004 | Fredlund et al. | .............. | 396/305 |
| 7,057,658 B1 | 6/2006 | Shioji et al. | | |
| 7,499,201 B2 * | 3/2009 | Kodama et al. | ................ | 358/474 |
| 7,600,187 B2 * | 10/2009 | Hasebe et al. | ................ | 715/743 |
| 7,681,976 B2 * | 3/2010 | Narusawa et al. | .............. | 347/19 |
| 2004/0077397 A1 | 4/2004 | Hosaka | | |
| 2006/0126095 A1 | 6/2006 | Tamura et al. | | |

FOREIGN PATENT DOCUMENTS

| | | |
|---|---|---|
| CN | 1476915 | 2/2004 |
| CN | 1520159 | 8/2004 |
| CN | 1787590 | 6/2006 |
| JP | 11-088521 | 3/1999 |
| JP | 2004-112595 | 4/2004 |
| JP | 3571217 | 9/2004 |
| JP | 2006-033260 | 2/2006 |
| JP | 2007-076241 | 3/2007 |

\* cited by examiner

*Primary Examiner* — Negussie Worku
(74) *Attorney, Agent, or Firm* — Edwards Wildman Palmer LLP; David G. Conlin; Steven M. Jensen (57) ABSTRACT

The image display system includes an image reading apparatus having an image reading portion for reading a document to output as first image data, and a data output portion for outputting the first image data accompanied with a plurality of specific image data or locations of the plurality of specific image data and display information data including a display time and display order of each specific image data, and a display apparatus having an image display portion for displaying the specific image data based on display information data of the specific image data in displaying the first image data.

11 Claims, 7 Drawing Sheets

SELECTED AS FOLLOWS.
  SAVING CONDITION: 600 dpi, PRINTABLE
  USAGE UNIT PRICE: 50 YEN (OPTION 3)

PLEASE SET DOCUMENT AND PRESS START KEY.

FIG. 4

READING IS COMPLETED.

THE NUMBER OF SHEETS OF READ DOCUMENTS: 20 SHEETS — 520

SERVICE CHARGE: 1000 YEN — 521

PLEASE PAY ABOVE-DESCRIBED SERVICE CHARGE AND CONNECT EXTERNAL TERMINAL OR MEMORY TO PREDETERMINED PLACE.

IMAGE DISPLAY SYSTEM

CROSS-NOTING PARAGRAPH

This non-provisional application claims priority under 35 U.S.C. §119(a) on Patent Application No. 2009-232686 filed in JAPAN on Oct. 6, 2009, the entire contents of which are hereby incorporated herein by reference.

FIELD OF THE INVENTION

The present invention relates to an image display system that displays image information with specific image information (such as an advertisement image) added.

BACKGROUND OF THE INVENTION

Conventionally, an image forming apparatus has been installed to provide printing service in an open space such as a convenience store or a public use facility. The image forming apparatus generally performs charging depending on the number of copies, however, provides lower-priced image output service by discounting the service by some of the service price with advertisement information added to the image.

In this way, by differentiating a copy charge in the case where the advertisement information is added from a copy charge in the case where the advertisement information is not added, convenience is provided for both a user and an advertisement information provider.

In Japanese Patent No. 3571217, a user is able to set the number of advertisement images on a recording material on which an image is recorded, and a service charge is determined depending on an area of an advertisement image occupied by the number of advertisement images, therefore, the user himself/herself is able to decide an occupancy area of the advertisement image that is considered to be most appropriate of his/her own will by taking the service charge and a value of the advertisement image into consideration according to a document.

However, in Japanese Patent No. 3571217, in the case where advertisement information is increased when printing a document image of the user on one sheet of printing paper, an area for printing the document image of the user is diminished. In addition, in order to make the area for printing the document image of the user larger, pieces and a volume of the advertisement information are limited.

SUMMARY OF THE INVENTION

An object of the present invention is to provide an image display system that is able to display an image required by a user in a broad area even when the number of specific images such as an advertisement is increased in displaying image data read by an image reading apparatus or image data such as a downloaded content and is convenient for both a specific image providing side and the user.

An image display system of the present invention includes an image reading apparatus having an image reading portion for reading a document to output as first image data, and a data output portion for outputting the first image data accompanied with a plurality of specific image data or locations of the plurality of specific image data and display information data including a display time and display order of each specific image data, and a display apparatus having an image display portion for displaying the specific image data based on the display information data of the specific image data in displaying the first image data.

The image display system also includes an output apparatus having a data output portion for outputting first image data to be displayed on a display apparatus accompanied with a plurality of specific image data or locations of the plurality of specific image data and display information data including a display time and display order of each specific image data, and a display apparatus having an image display portion for displaying the specific image data based on the display information data of the specific image data in displaying the first image data output from the output apparatus.

The image display portion of the display apparatus sets respective display areas of the first image data and the specific image data, displays the first image data in the first image data display area, and displays the specific image data in the specific image data display area.

Alternatively, the image display portion of the display apparatus displays the first image data after displaying the specific image data.

In addition, an image processing method of the present invention includes a data outputting step of outputting first image data to be displayed on a display apparatus accompanied with a plurality of specific image data or locations of the plurality of specific image data and display information data including a display time and display order of each specific image data, and an image displaying step of displaying the specific image data based on the display information data of the specific image data in displaying the first image data.

Moreover, it is also possible to solve the above-described problem by creating an image processing program for causing a computer to function as the above-described each processing portion of the image reading apparatus, the output apparatus, an image processing apparatus, and the display apparatus (image reading portion, data output portion, image display portion, etc.), or recording the image processing program in a computer-readable recording medium and executing the image processing program by the computer.

PREFERRED EMBODIMENTS OF THE INVENTION

Description will hereinafter be given for an embodiment of the present invention with reference to drawings.

The present invention is to output data combining document image data read by an image reading apparatus, a charge of a user according to a saving condition, and specific image data of the number corresponding to the charge to an external memory, etc., and display the document image data in the data that was output to the external memory, etc., by switching display of the specific image at a predetermined time. The specific image is an image having an added value such as an advertisement for both an image providing side and the user.

In this way, since the specific image is switched to be displayed, a document image of the user may be displayed without making the document image of the user smaller.

First, using FIG. 1 to FIG. 6, brief description will be given for an operation of the embodiment of the present invention by taking a case, as an example, where a user uses an image reading apparatus installed in a convenience store, etc., to read twenty sheets of A4-size color document image, and record their image data in a USB memory to display the read document image and a specific image from the USB memory. Such service is called an image reading service function.

Figure 1:
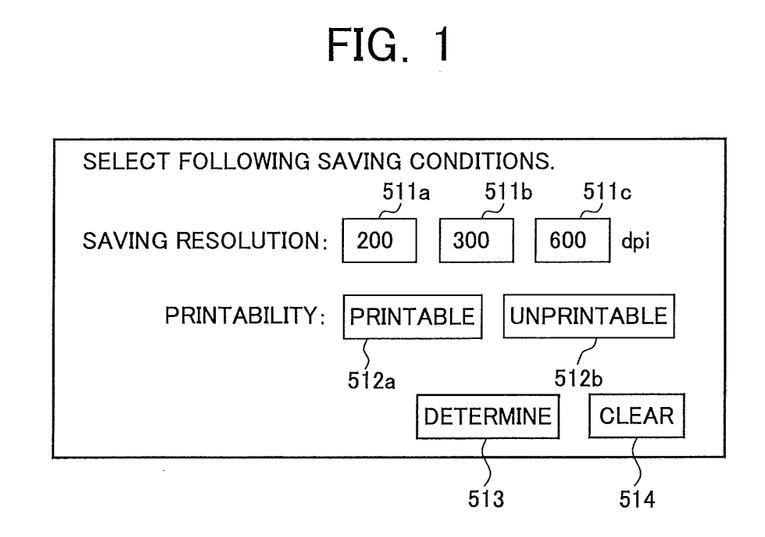
FIG. 1 is a screen for selecting a saving condition.

When the user selects the image reading service function by using an operation screen of the image reading apparatus, a screen for selecting a saving condition as shown in FIG. 1 is displayed.

FIG. 1 is a screen for selecting a saving resolution and whether or not there is a desire for printing the saved image data. Selection is performed by pressing an area displaying a value desired to be selected, and the selected area is reversing displayed.

For example, when the read document image is desired to be output to the USB memory at the saving resolution of 600 dpi and to be printed after viewing, an area 511c is pressed and an area 512a is pressed. The respective pressed areas are thereby reversing displayed.

Here, in the case where the selection is wrong, when an area 514 is pressed, the previously selected saving resolution and printability become invalid.

Figure 2:
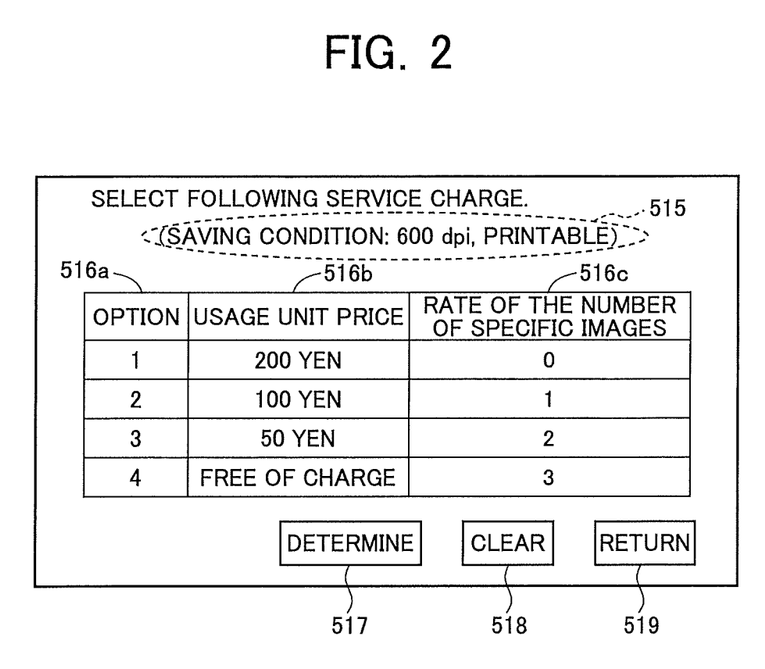
FIG. 2 is a screen for selecting a service charge.

On the other hand, when the selection is right, the selection is determined by pressing an area 513, and a selection screen of a service charge shown in FIG. 2 is displayed.

In FIG. 2, the saving condition selected in FIG. 1 is displayed in an area 515 for confirmation, and further, options of a service charge of document reading service of an A4 document are displayed. An area 516b shows a service charge (usage unit price) per one sheet of the A4 document when a specific image is added at a rate shown in an area 516c, and an area 516a shows option numbers.

For example, when up to two specific images per one sheet of a document may be added, the usage unit price is 50 yen.

Figure 3:
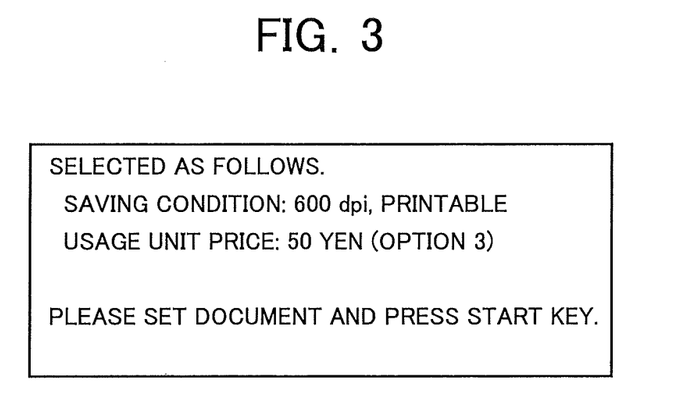
FIG. 3 is a screen for promoting starting of document reading.

When the service is provided at the usage unit price 50 yen of an option 3 and the rate of the number of the specific images 2, by pressing an area of the option 3 in the area 516a and further pressing an area 517, the screen illustrated in FIG. 3 is displayed.

In addition, in the case where the selection is wrong, when an area 518 is pressed, the selection becomes invalid, therefore selection is performed again. Moreover, when the saving condition is desired to be selected again, it is possible to return to a saving condition selection screen of FIG. 1 by pressing an area 519.

Figure 4:
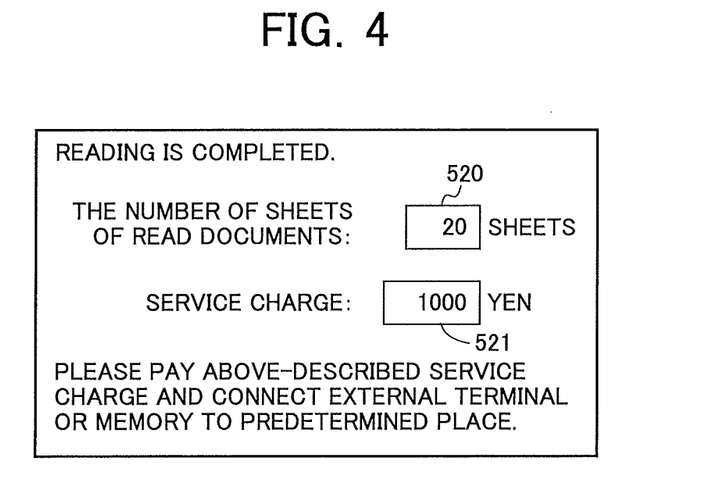
FIG. 4 is a screen for payment of a charge.

A screen of FIG. 3 is for confirming the selected saving condition and usage unit price and for promoting starting of document reading, and the user sets a document on a reading platen or an auto document reading apparatus, sets a reading condition, presses a start key, then the document is read, and a screen of payment of a service charge illustrated in FIG. 4 is displayed.

In FIG. 4, an area 520 showing the number of sheets of the read document and an area 521 showing the service charge of the service are displayed, and an instruction to pay the charge and an instruction to insert the USB memory into a predetermined connection part are given.

When the user pays the instructed charge by electronic money, for example, and inserts the USB memory therein, specific image data to be output accompanied with the read document image data, a display time and display order of these image data, and printability selected by the user are written in the USB memory.

Here, the above-described specific image is selected from among specific images held based on information on age, sex, or interested field, etc., separately specified by the user or information provided by a providing side of the specific image.

In addition, the display time may be a time to the extent that a content of the specific image may be read, or may be a display time calculated based on information provided by the providing side of the specific image (priority, publicity cost, the number of characters of publicity, image resolution, etc.).

Moreover, regarding the display order of the document image and the specific image, first, the specific image is displayed by switching one by one, and thereafter the document image is displayed so that the specific image may be viewed by the user without fail.

Next, description will be given for a displaying method of data created and stored in the USB memory as described above.

Figure 5:
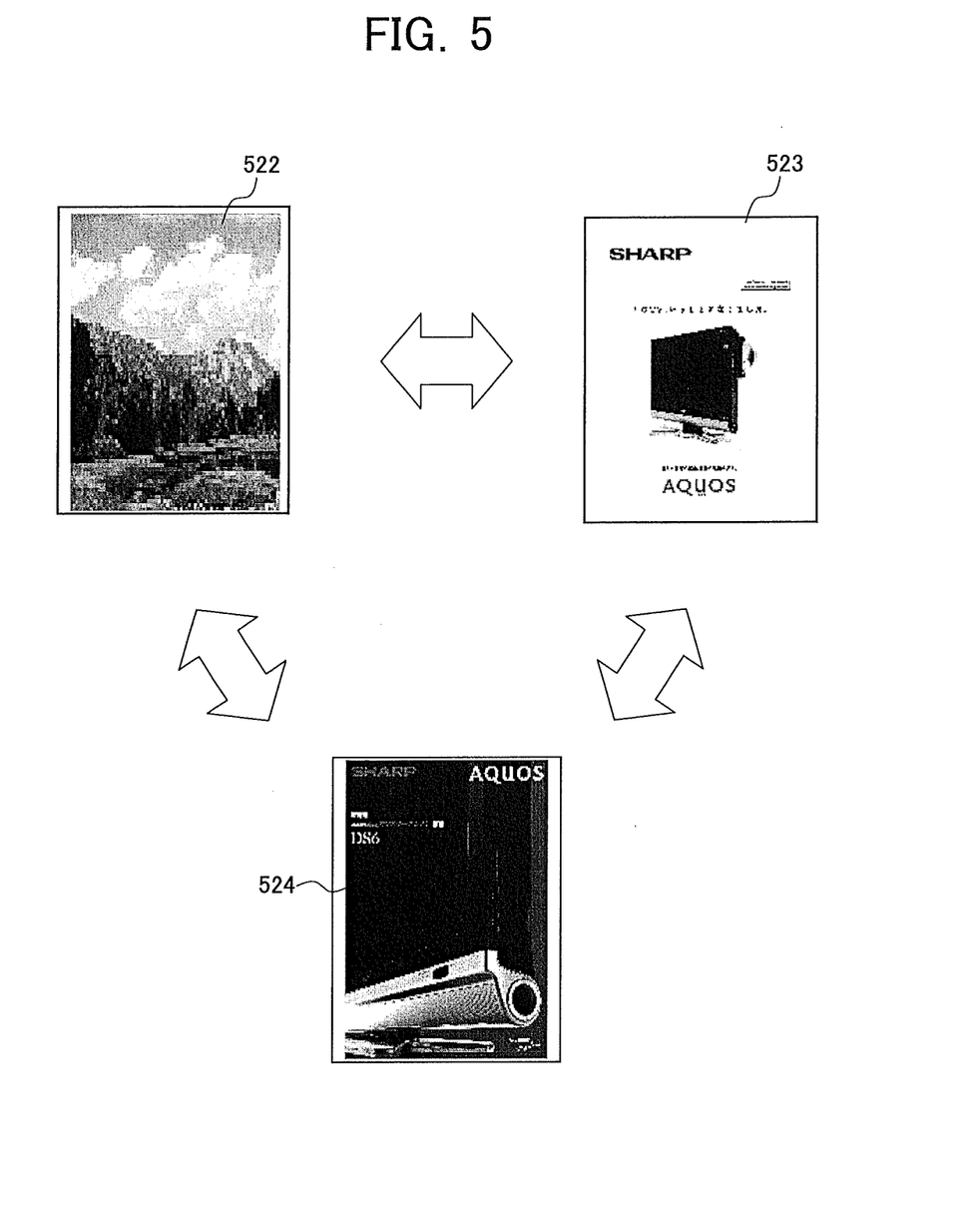
FIG. 5 is a diagram describing a first displaying method that displays a document image and a specific image.

A first displaying method is, as shown in FIG. 5, to display the document image and the specific image (assumed to be an advertisement image here) written in the above-described USB memory on one screen, respectively.

First, the document image read by the user is displayed for a certain time like a screen 522, thereafter the specific image is displayed for a certain time like a screen 523, thereafter another specific image is further displayed for a certain time like a screen 524, and thereafter the document image is further displayed like the screen 522. Here, the display time of the document image is set to be longer than the display time of the specific image, and the display time of the specific image is set to be a time to the extent that advertisement information may be read.

In addition, first, the specific image is displayed for a certain time like the screen 523, thereafter another specific image may be displayed for a certain time like the screen 524, and thereafter the document image may be displayed like the screen 522. Such display order makes it possible to show the specific image to the user without fail.

Figure 6:
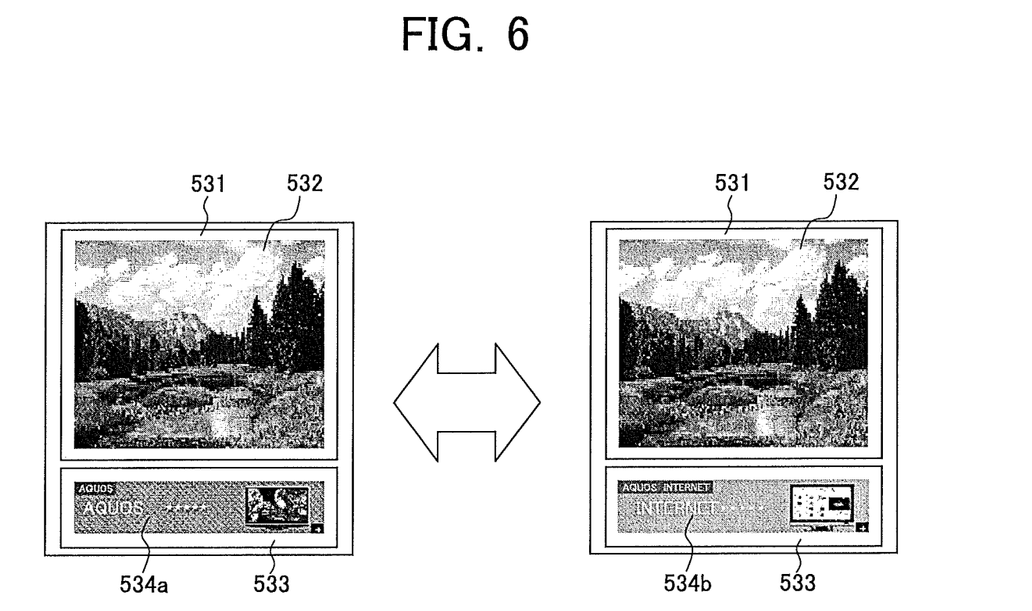
FIG. 6 is a diagram describing a second displaying method that displays the document image and the specific image.

A second displaying method is, as shown in FIG. 6, to divide one screen into a broad document image display area for displaying the document image and a narrow specific image display area for displaying the specific image.

A document image 532 is always displayed in a document image display area 531 and a specific image 534 is displayed in a specific image display area 533. A specific image 534a is displayed for a certain time, thereafter a specific image 534b is displayed for a certain time, and thereafter the specific image 534a is displayed. From then on, the display is repeated by switching specific images.

Thereby, a display area of the document image of the user is always fixed and only the specific image display area is switched, therefore it is possible to view the document image of the user continuously.

Description will hereinafter be given for an image display system of the present embodiment.

The image display system of the present embodiment is comprised of an image reading apparatus and a display apparatus.

In the image reading apparatus, the saving condition is input, the read document image is converted in accordance with the saving condition, and data in which the converted document image is accompanied with the specific image according to the service charge and the display time and the display order of each of the specific image is output.

In addition, the display apparatus displays the document image and the specific image output in the image reading apparatus based on individual display time and display order.

Transmission/reception of data between the image reading apparatus and the display apparatus may be either of the following.

(1) An external storage apparatus such as a USB memory is connected to the image reading apparatus, and the above-described data is stored therein and read by connecting the external storage apparatus to the display apparatus.

The connection form may be either of a wired connection or Near Field Communication.

Note that, in the following embodiment, description will be given for a case where the above-described data is transmitted/received through the external storage apparatus.

(2) The image reading apparatus and the display apparatus are connected to a network using an Internet or a public line, etc., and the above-described data is transmitted to/received at an address of the display apparatus input by the image reading apparatus through the network.

Next, description will be given for a detailed configuration of the image reading apparatus of the present embodiment.

Description will be given using the image reading apparatus in the present embodiment, but the embodiment is applied to image processing apparatuses in general, and is applicable, for example, to software that executes a scanner function, or a so-called MFP (Multi Function Peripheral), etc., combining a copy function, a facsimile (FAX) function, a printing function, a scanner function, a function of delivering an input image, and the like.

Figure 7:
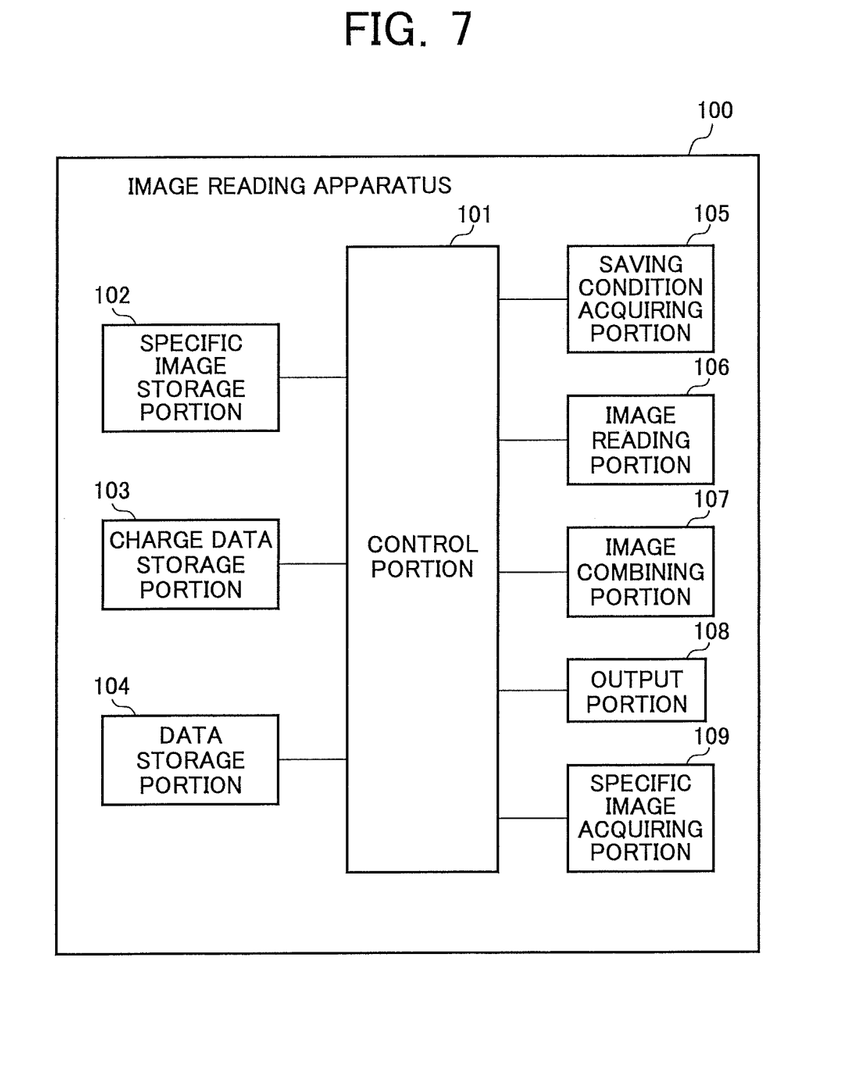
FIG. 7 is a block diagram showing a function configuration of an image reading apparatus of an embodiment.

FIG. 7 is a block diagram showing a function configuration of the image reading apparatus of the present embodiment, and in the same diagram, an image reading apparatus 100 is configured by including a control portion 101, a specific image storage portion 102, a charge data storage portion 103, a data storage portion 104, a saving condition acquiring portion 105, an image reading portion 106, an image combining portion 107, an output portion 108, and a specific image acquiring portion 109.

The control portion 101 controls an entire of the image reading apparatus 100, and operates the image reading service function of the present embodiment or periodically operates the specific image acquiring portion 109 to acquire information related to the specific image.

The specific image acquiring portion 109 is, when a possible period for providing the specific image is over, or at a certain time interval, automatically connected to a server in which specific image information is saved through an external communication network, collects data as to predetermined data items (see below), and updates the specific image storage portion 102.

The specific image storage portion 102 stores the following data items for each specific image.

Identifier: a sigh for identifying the specific image in the specific image storage portion 102.

Specific image data: image data having a possibility of yielding benefit for the user and the providing side due to viewing by the user such as an advertisement image or an advertisement video image.

Information for selecting from an attribute of the user: an age group and sex of the user who is interested in a content of the specific image, and classification shown by the content of the specific image, etc.

Information provided by the providing side: information showing a degree that the providing side desires to provide the specific image to the user, priority, production cost of the specific image and advertisement and publicity cost, the number of characters that are present in the specific image, resolution of the specific image, and the like.

Period when providing is possible: a period when the specific image is able to be provided to the user, and when the providing period is over, data for the specific image data is deleted.

When the user selects the image reading service function by using the operation screen of the image reading apparatus 100, the saving condition acquiring portion 105 is operated by the control portion 101 and executes the following functions.

(1) Acquiring the Saving Condition of the Document Image:

When the saving condition acquiring portion 105 is operated, the screen for selecting the saving condition as shown in FIG. 1 is displayed, processing for the selection operation of the user is performed, and the saving resolution and printability selected by the user on the screen are acquired.

(2) Acquiring a Service Charge:

Next, when it is detected that a determination area 513 is pressed on the screen of FIG. 1, the selection screen of the service charge shown in FIG. 2 including the saving condition selected in FIG. 1 is displayed.

Here, the usage unit price and the rate of the number of the specific images of each option are obtained as follows.

First, the charge data storage portion 103 stores the following data items with a combination of values of each data item.

Saving resolution: a resolution when the document image is stored, and for example, either of 600, 300, or 200 dpi is stored.

Printability: either of being printable or being unprintable is stored.

Usage unit price: a usage unit price per one sheet of the document when the specific image is not added.

The number of the specific images to be free of charge: the number of the specific images to be free of charge when the specific image is added to the document image.

The above-described usage unit price and the number of specific images to be free of charge are stored corresponding to a combination of the saving resolution and the printability.

Next, the charge data storage portion 103 is referred to acquire the usage unit price (assumed to be A yen) and the number of specific images to be free of charge (assumed to be N pieces) corresponding to the saving resolution and the printability specified by the user on the screen of FIG. 1.

Next, assuming that the usage unit price for none of the specific images to be added is A yen, and the usage unit price when the number is N is free of charge, the usage unit price when K pieces therebetween of the specific images are added is calculated by a predetermined function or a table.

For example, in the above-described table, a providing unit price that an advertiser providing the specific image provides per one specific image is assumed to be B yen, and when the number of the specific images to be added increases, the user will view a plurality specific images, therefore the providing unit price given by the advertiser is discounted depending on the number of the specific images to be added, thus the service charge may be obtained by the following formula.

Usage unit price=A−B×(Discount rate of the providing unit price depending on the number of the specific images K)×K The number of the specific images calculated here is the number per one sheet of the document, therefore will hereinafter be referred to as a "rate of the number of the specific images".

Finally, pairs of the usage unit price and the rate of the number of the specific images from 0 piece to N pieces of the specified images are displayed on a screen like FIG. 2, and processing for the selection operation of the user is performed to acquire an option (the usage unit price and the rate of the number of the specific images) selected by the user on the screen.

(3) Promoting Document Reading:

Next, when it is detected that a determination area 517 is pressed on the screen of FIG. 2, a screen like FIG. 3 for promoting starting of document reading is displayed including the saving condition and the usage unit price selected in FIG. 1 and FIG. 2.

The user reads a displayed content of FIG. 3, sets the document on the reading platen or in the auto document reading apparatus, sets a reading condition (scaling, a type of document, etc.), and presses a start key.

The saving condition acquiring portion 105 detects that the start key is pressed, stores the document image data read by the image reading portion 106 in the data storage portion 104, and displays a screen of instructing payment of a charge as shown in FIG. 4.

(4) Promoting Payment of a Charge:

Finally, the user confirms the number of sheets of the read document and the service charge of the image reading service which are displayed in FIG. 4, pays the instructed service charge by electronic money, for example, and inserts the USB memory into the predetermined position.

The saving condition acquiring portion 105, when confirming the payment of the charge and the insertion of the USB memory, stores a storage place of the document image data, printability, and the number of the specific images to be added in the data storage portion 104 and returns the control to the control portion 101 so as to combine the read document image and the specific image.

The image reading portion 106 is operated from the saving condition acquiring portion 105, reads the document put on a document platen or the auto document reading apparatus to convert into electronic data, which is converted into the saving resolution specified by the user to be stored in the data storage portion 104, and returns the number of sheets of the read document and the storage place storing the document image data to the saving condition acquiring portion 105.

When an end of the saving condition acquiring portion 105 is detected by the control portion 101, the image combining portion 107 is operated from the control portion 101 to execute the following functions.

(1) Selecting the Specific Image to be Added:

Based on information provided by the providing side of the specific image stored in the specific image storage portion 102, the specific images to be added to the read document are selected by the number of the specific images, and identifiers of the selected specific images are stored in the data storage portion 104 in order of selection.

The selection order is, for example, descending order of priority, descending order of the production cost or the advertisement and publicity cost, descending order of characters present in the specific images and resolution of the specific images.

In addition, when information of age, sex, interested field, etc., of the user is separately acquired in the saving condition acquiring portion 105, based on the information for selecting from the attribute of the user of the specific image stored in the specific image storage portion 102, the specific images to be added to the read document image may be selected for the number of the specific images. Moreover, selection may be performed based on both information of the attribute of the user and the information provided by the providing side.

(2) Deciding a Display Time:

The display time of the read document image data and each data of the selected specific image data is decided. The display time of the document image and the specific image is predetermined time respectively, however, the display time of the document image is lengthened and the display time of the specific image is limited to the extent that the content thereof may be read. In addition, the display time of the specific image may be a display time depending on the information provided by the providing side of the specific image.

(3) Combining Image Data:

A data format is comprised of a header part and a data part.

In the header part, the number of the document images, the number of the specific images, printability, and a display time corresponding to the order of image data to be recorded in the data part are recorded.

In the data part, the document image data are recorded for the number of the document images recorded in the header part, and thereafter the specific image data are recorded for the number of the specific images recorded in the header part.

Order of displaying image data referred to in the present invention indicates order of a sequence of image data to be recorded in the data part.

First, the document image data is recorded in order of being read, thereafter the specific image data are recorded in descending order of display priority stored in the specific image storage portion 102 to constitute the above-described data part.

Next, the number of sheets of the read document, the number of the selected specific images, printability specified by the user, and each display time corresponding to the order of the image data recorded in the data part constitute the header part.

The image combining portion 107 stores the header part and the data part constituted here in the data storage portion 104 as a batch of composite data, and returns control to the control portion 101 so as to output the composite data.

When an end of the image combining portion 107 is detected by the control portion 101, the output portion 108 is operated from the control portion 101, reads out the composite data combined in the image combining portion 107 from the data storage portion 104, and outputs the data to the USB memory connected to the image reading apparatus 100.

Figure 8:
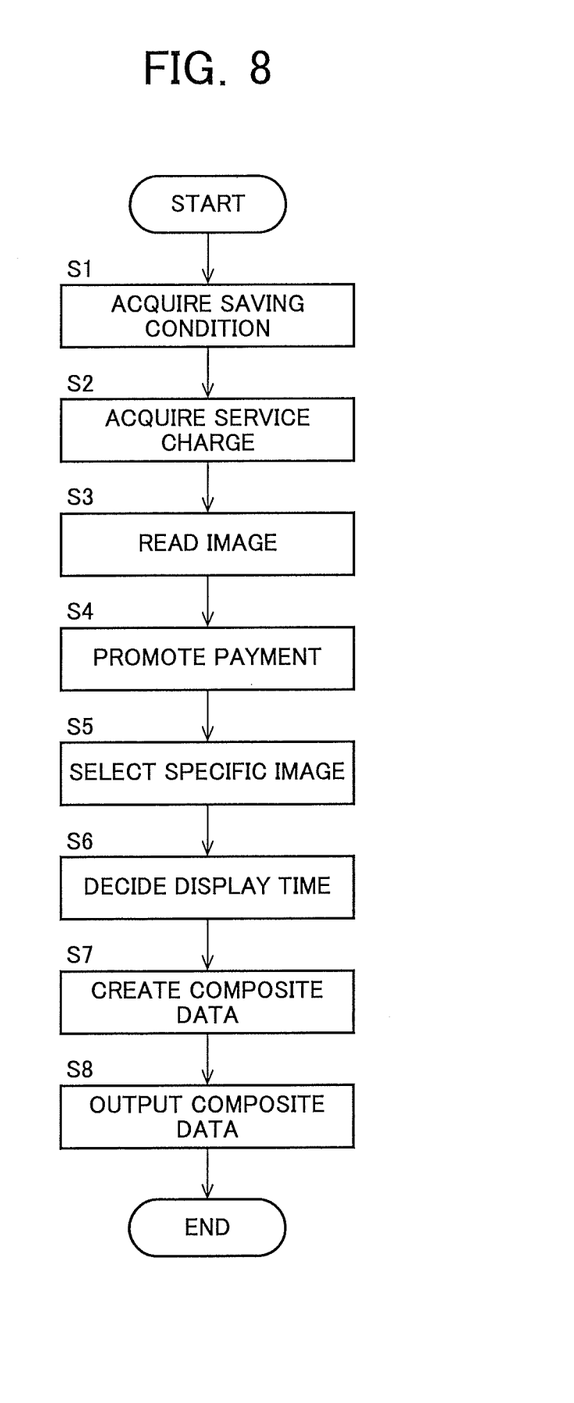
FIG. 8 is a flowchart showing a processing procedure of the image reading apparatus of the embodiment.

Next, description will be given for a processing procedure of the image reading apparatus 100 of the present embodiment based on a flowchart shown in FIG. 8.

When the user uses the operation screen of the image reading apparatus 100 to select the image reading service function, the screen for selecting the saving condition as shown in FIG. 1 is displayed, and the processing for the selection operation of the user is performed to acquire the saving resolution and printability selected by the user (step S1).

Next, the selection screen of the service charge shown in FIG. 2 is displayed, the processing for the selection operation of the user is performed to acquire the option (the usage unit price and the rate of the number of the specific images) selected by the user, and the screen for promoting starting of document reading shown in FIG. 3 is displayed including the saving condition and the usage unit price (step S2).

Next, when the user reads the content displayed in FIG. 3, sets the document on the reading platen or the auto document reading apparatus, sets the reading condition (scaling, a type of document, etc.), and presses the start key, it is detected that the start key is pressed, the document image data read by the image reading portion 106 is converted into the saving resolution specified by the user, stored in the data storage portion 104, and the screen instructing the payment of the charge shown in FIG. 4 is displayed (step S3).

When the user confirms the number of sheets of the read document and the service charge of the image reading service displayed in FIG. 4, pays the instructed service charge, and inserts the USB memory into the predetermined position, the storage place of the document image data, printability, and the number of the specific images to be added are stored in the data storage portion 104 (step S4).

Next, based on the information provided by the providing side of the specific image stored in the specific image storage portion 102, the specific images to be added to the read document image are selected, and the identifiers of the specific images are stored in the data storage portion 104 in the selection order (step S5).

Next, the display time of the read document image data and each selected specific image data is determined (step S6).

Next, the data part recording the read document image data and the selected specific image data in order is constituted, and the number of sheets of the read document, the number of the selected specific images, printability selected by the user, each display time corresponding to the order of the image data recorded in the data part constitute the header part and are stored in the data storage portion 104 as a batch of composite data (step S7).

Finally, the data combined into a batch is read out from the data storage portion 104 to be output to the USB memory connected to the image reading apparatus 100, and when the execution of the image reading service function specified by the user is ended, all data temporarily generated during the execution of the service are deleted from the data storage portion 104 (step S8).

Next, description will be given for the display apparatus of the present embodiment.

Figure 9:
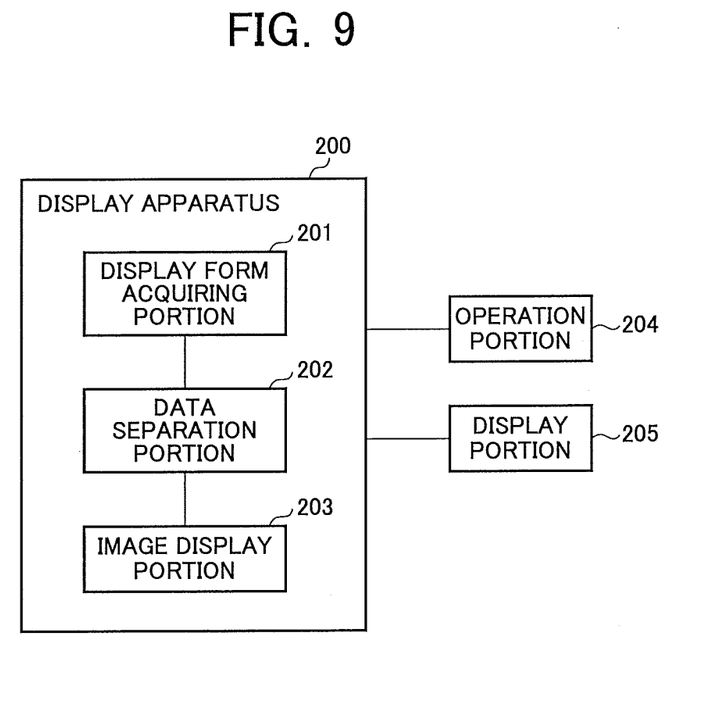
FIG. 9 is a block diagram showing a function configuration of a display apparatus of the embodiment.

As shown in FIG. 9, a display apparatus 200 is comprised of an information processing apparatus such as a computer provided with an operation portion 204 including a keyboard, a mouse, etc., and a display portion 205 including a liquid crystal display apparatus, etc., and has functions of a display form acquiring portion 201, a data separation portion 202, and an image display portion 203.

In the display apparatus 200, the display form acquiring portion 201 is executed due to the selection of a display function of the composite data by the operation portion 204, and displays options of display forms shown bellow on the display portion 205, and let the user input an option.

The options include (1) a mode of displaying the document image and the specific image in different areas, and (2) a mode of displaying the document image and the specific image in order.

The data separation portion 202 reads the composite data specified by the user from among composite data recorded in the USB memory and displayed on the display portion 205, separates each data in the header part and the data part, and stores the data in a memory, etc., respectively.

The image display portion 203 performs processing as follows according to a display mode acquired in the display form acquiring portion 201.

(1) In the case of the mode of displaying the document image and the specific image in different areas:

Respective display areas of the document image and the specific image are set on a screen on the display portion 205. In the display areas, as shown in FIG. 6, setting is made such that the display area for displaying the document image is broad and the display area for displaying the specific image is narrow.

Next, the document image data separated in the data separation portion 202 is displayed in the recorded order thereof in the document image display area. The display time of each image data in this case is a display time corresponding to the document image data separated in the data separation portion 202. Note that, as to the document image, display of each image may be controlled based on the instruction of the user.

In addition, the specific image data separated in the data separation portion 202 is displayed in the recorded order thereof in the specific image display area. The display time of each image data in this case is a display time corresponding to the specific image data separated in the data separation portion 202.

After all of the document image data and the specific image data are displayed, the process returns to beginning to repeat display.

Thereby, the display area of the document image of the user is always fixed and only the display of the specific image area is switched, therefore it is possible to view the document image of the user continuously.

(2) In the case of the mode of displaying the document image and the specific image in order:

First, the specific image data separated in the data separation portion 202 is displayed in the recorded order thereof on the screen of the display portion 205. The display time of each image data in this case is a display time corresponding to the specific image data separated in the data separation portion 202.

After display of all the specific image data is finished, the document image data separated in the data separation portion 202 is displayed in the recorded order thereof on the screen of the display portion 205. The display time of each image data in this case is a display time corresponding to the document image data separated in the data separation portion 202. After display of all the document image data is finished, the process returns to the display of the specific image data to be repeated.

Thereby, it is possible to cause the user to view the specific image without fail, therefore a publicity efficiency of an advertisement is improved.

Note that, the display of the document image data may be first, and the display of the specific image data may come next.

In addition, when "printable" is recorded in printability separated from the composite data, it is possible to give a printing instruction by operating the operation portion 204, and therefore it is possible to improve publicity effect.

Moreover, the present invention is not limited to the above-described embodiment and various modifications and alterations can certainly be made without departing from the scope of the present invention.

For example, the following modifications may be considered in the above-described saving condition acquiring portion 105.

Modification Example 1

The user is caused to specify only the saving resolution, a plurality of options in which the usage unit price and the rate of the number of the specific images are corresponded to the saving resolution are displayed, and a setting may be made so as to make printing of the document image read by the user impossible when the rate of the number of the specific images selected by the user from the options is small, and so as to make printing possible when being large.

For example, when about two advertisement images are usually added, the user is able to acquire an added value that printing is possible even though having more advertisement screens.

Modification Example 2

Only printability of the document image is caused to be specified, the plurality of options in which the usage unit price and the rate of the number of the specific images are corresponded to the printability are displayed, and a setting may be made so as to make the saving resolution higher when the rate of the number of the specific images selected by the user from the options is large, and so as to make the saving resolution lower when being small.

For example, when about two advertisement images are usually added, an image is formed at the saving resolution of about 200 dpi, however, when three or more advertisement images are added, an image is formed at the saving resolution of about 600 dpi.

The user thereby acquires a clearer image, thus it is possible to provide clearer advertisement information.

Modification Example 3

The plurality of options in which the usage unit price and the rate of the number of the specific images are corresponded to each other are displayed, and the specific images of the number corresponding to the rate of the specified images selected by the user from the options are acquired.

For the acquiring, acquirement availability may be set depending on the largeness of the rate of advertisement cost provided by the providing side or the number of advertisement image information (resolution of an image or the number of character information) from among the specific images stored in the specific image storage portion.

In addition, in the above-described embodiment, a charging system may be differentiated according to a property of an image such as a difference between monochrome and color, or a difference in a document size.

Other Modification Example

Note that, in the above-described embodiment and modification examples, reading of an image is performed by reading a document with the image reading apparatus, but not limited thereto, the following image data is also allowed:

(1) image data that is obtained by generating one image data in a memory of a digital camera and the like connected to an image processing apparatus in a file for displaying, (2) image data generated by downloading image data of a content on a web at an image processing apparatus connected to a network, and the like.

In addition, in the above-described embodiment and modifications, display information comprised of the display time and the display order of the plurality of the specific image data are added to the read image data and are stored in the same recording medium, however, the following is also allowed.

(1) The read image data and the display information, without being combined, may be stored in the same recording medium as separate data files.

(2) In the above-described display information, a file for outputting a plurality of specific image data and a file for outputting the display time and the display order of each specific image data may be the same file, or separate files. In this case, a presence position of a file storing specific image data and the display time and the display order of the specific image data are caused to be associated with each other.

(3) Further, the specific image data may not be stored in the recording medium as a file, and in this case, locations at which the specific image data is present (for example, URI (Uniform Resource Identifier) of a network or other recording medium), the display time, and the display order are caused to be associated with each other.

(4) Further, the above-described files may be recorded in separate recording media, not in the same recording medium.

In addition, it is needless to say that an object of the present invention is achieved by creating a program for causing a computer to function as each processing portion of the image reading apparatus or the display apparatus constituting the above-described embodiment (for example, control portion, saving condition acquiring portion, image reading portion, image combining portion, output portion, specific image acquiring portion, display form acquiring portion, composite data separation portion, image display portion, etc.) to be written in a recording medium in advance, storing the program recorded in the recording medium in a memory provided in the apparatus or a storage apparatus, and executing the programs in a CPU (Central Processing Unit) or an MPU (Micro Processing Unit) of the computer.

In this case, the program itself read from the recording medium is to realize the function of the above-described embodiment, and the program and the recording medium recording the program constitute the present invention.

In addition, in the above-described program, such a case is also included that the function of the above-described embodiment is, based on the instruction of the program, realized by processing together with an operating system or other application program, etc.

Note that, the program that realizes the function of the above-described embodiment may be provided by a recording medium including a disc type (for example, a magnetic disc, an optical disc, etc.), a card type (for example, a memory card, an optical card, etc.), a semiconductor memory type (for example, a ROM, a nonvolatile memory, etc.), and a tape type (for example, a magnetic tape, a cassette tape, etc.). Alternatively, the above-described program stored in the storage apparatus through a network or a broadcast wave may be directly provided from a server computer. In this case, the storage apparatus of the server computer is also included in the recording medium of the present invention.

According to the present invention, by switching and displaying a specific image such as an advertisement, etc., it is possible to provide the specific image such as an advertisement to a user without diminishing a display area of image data read by an image reading apparatus or image data of a downloaded content, etc.

In addition, since the image data read by the image reading apparatus or the image data of the downloaded content, etc., may be displayed at a low price or free of charge, it is possible to provide convenience for both the user and a specific image provider due to utilization at a low price by the user and improvement of a publicity efficiency on a providing side of the specific image.

The invention claimed is:

1. An image display system, comprising:
an image reading apparatus comprising:
an operation screen for selecting at least a printing condition for image data and specific image data to be output with the image data;
an image reading portion for reading a document to output as the image data; and a data output portion for outputting the image data read by the image reading portion and the specific image data or locations of the specific image data based on display information data including a display time and display order of each specific image data; and a display apparatus comprising:

an image display portion for displaying the specific image data and the image data based on the display information data.

2. An image display system, comprising:

an operation screen for selecting at least a printing condition for image data and specific image data to be output with the image data;

an output apparatus comprising:

a data output portion for outputting the image data to be displayed on a display apparatus and the specific image data or locations of the specific image data based on display information data including a display time and display order of each specific image data; and the display apparatus comprising:

an image display portion for displaying the specific image data and the image data based on the display information data.

3. The image display system of claim 1, wherein the image display portion switches between displaying each specific image data for a predetermined period of time.

4. The image display system as defined in claim 1 or 2, wherein the image display portion of the display apparatus sets respective display areas of the image data and the specific image data, displays the image data in the first image data display area, and displays the specific image data in the specific image data display area.

5. The image display system as defined in claim 1 or 2, wherein the image display portion of the display apparatus displays the image data after displaying the specific image data.

6. The image display system of claim 2, wherein the image display portion switches between displaying each specific image data for a predetermined period of time.

7. An image processing apparatus, comprising:

an operation screen for selecting at least a printing condition for image data and specific image data to be output with the image data;

an image reading portion for reading a document to output as the image data; and a data output portion for outputting the image data to be displayed on a display apparatus and the specific image data or locations of the specific image data based on display information data including a display time and display order of each specific image data.

8. An output apparatus comprising:

an operation screen for selecting at least a printing condition for image data and specific image data to be output with the image data;

a data output portion for outputting the image data to be displayed on a display apparatus and the specific image data or locations of the specific image data based on display information data including a display time and display order of each specific image data.

9. A display apparatus comprising:

an image display portion for displaying image data and specific image data or locations of the specific image data based on display information data including a display time and display order of each specific image data, the image data and the specific image data being displayed on the image display portion based on selections of at least a printing condition for the image data and the specific image data made via an operation screen.

10. An image displaying method, comprising:

selecting via an operation screen at least a printing condition for image data and specific image data to be output with the image data;

a data outputting step of outputting the image data to be displayed on a display apparatus and the specific image data or locations of the plurality of specific image data based on display information data including a display time and display order of each specific image data; and an image displaying step of displaying the image data and the specific image data based on the display information data.

11. The image display method of claim 10, wherein the image displaying step includes switching between displaying each specific image data for a predetermined period of time.

* * * * *